United States Patent [19]

West et al.

[11] Patent Number: 4,622,284

[45] Date of Patent: Nov. 11, 1986

[54] PROCESS OF USING METAL AZIDE RECORDING MEDIA WITH LASER

[75] Inventors: John L. West; James T. Russell, both of Salt Lake City, Utah

[73] Assignee: Digital Recording Corporation, Wilton, Conn.

[21] Appl. No.: 585,175

[22] Filed: Mar. 1, 1984

[51] Int. Cl.$^4$ ............... G03C 5/16; G01D 15/14; G01D 15/34

[52] U.S. Cl. ................... 430/290; 430/141; 430/320; 430/321; 430/346; 430/495; 430/945; 346/76 L; 346/135.1

[58] Field of Search ........... 430/290, 141, 346, 320, 430/321, 495, 945; 346/76 L, 135.1

[56] References Cited

U.S. PATENT DOCUMENTS

| | | | |
|---|---|---|---|
| 2,703,283 | 3/1955 | Eggert | 430/346 |
| 3,062,650 | 11/1962 | Sagura et al. | 430/196 |
| 3,092,494 | 6/1963 | Sus et al. | 430/194 |
| 3,143,418 | 8/1984 | Priest et al. | 430/194 |
| 3,282,693 | 11/1966 | Sagura et al. | 430/196 |
| 3,285,742 | 11/1966 | Wagner | 430/194 |
| 3,298,833 | 1/1967 | Gaynor | 430/290 |
| 3,316,088 | 4/1967 | Schaffert | 430/55 |
| 3,334,353 | 8/1967 | Everest | 346/76 L |
| 3,462,268 | 8/1969 | Danhauser et al. | 430/194 |
| 3,465,352 | 9/1969 | Carlson et al. | 346/76 L |
| 3,474,457 | 10/1969 | Becker | 346/76 R |
| 3,515,554 | 6/1970 | Robillard | 430/194 |
| 3,519,424 | 7/1970 | Reynolds et al. | 430/194 |
| 3,526,542 | 9/1970 | Wiese, Jr. et al. | 430/346 |
| 3,598,585 | 8/1971 | Gaspar | 430/196 |
| 3,598,586 | 8/1971 | Gaspar | 430/194 |
| 3,617,278 | 11/1971 | Holstead | 430/194 |
| 3,626,143 | 12/1971 | Fry | 219/121 LJ |
| 3,660,093 | 5/1972 | Ranz et al. | 430/194 |
| 3,674,479 | 7/1972 | Kampfer et al. | 430/194 |
| 3,674,480 | 7/1972 | Kampfer et al. | 430/194 |
| 3,715,734 | 2/1973 | Fajans | 346/76 R |
| 3,721,566 | 3/1973 | Laridon et al. | 430/194 |
| 3,752,671 | 8/1973 | Singh | 430/196 |
| 3,758,303 | 9/1973 | Singh | 430/194 |
| 3,764,335 | 10/1973 | Nelson | 430/196 |
| 3,767,409 | 10/1973 | Grisdale et al. | 430/196 |
| 3,778,269 | 12/1973 | Wiegand | 430/194 |
| 3,787,210 | 1/1974 | Roberts | 430/945 |
| 3,817,757 | 6/1974 | Yabe et al. | 430/194 |
| 3,856,531 | 12/1974 | Grisdale et al. | 430/196 |
| 3,887,379 | 6/1975 | Clecak et al. | 430/197 |
| 3,933,497 | 1/1976 | Singh | 430/194 |
| 3,984,250 | 10/1976 | Holstead et al. | 430/192 |
| 4,023,185 | 5/1977 | Bloom et al. | 340/76 L |
| 4,032,691 | 6/1977 | Kido et al. | 346/76 L |
| 4,060,032 | 11/1977 | Evans | 346/76 L |
| 4,069,487 | 1/1978 | Kasai et al. | 346/76 L |
| 4,099,973 | 7/1978 | Miura et al. | 430/196 |
| 4,103,616 | 8/1978 | Chu et al. | 430/194 |
| 4,116,692 | 9/1978 | Yabe et al. | 430/194 |
| 4,118,229 | 10/1978 | Rauch et al. | 346/76 L |
| 4,139,853 | 2/1979 | Ghekiere et al. | 346/76 L |
| 4,190,843 | 2/1980 | Spong | 346/135.1 |
| 4,191,573 | 3/1980 | Toyama et al. | 430/194 |
| 4,230,939 | 10/1980 | de Bont et al. | 346/76 L |
| 4,287,294 | 9/1981 | Rubner et al. | 430/194 |
| 4,300,143 | 11/1981 | Bell et al. | 346/135.1 |
| 4,305,081 | 12/1981 | Spong | 346/135.1 |
| 4,313,188 | 1/1982 | Bartolini et al. | 346/135.1 |
| 4,404,656 | 9/1983 | Cornet | 346/135.1 |

FOREIGN PATENT DOCUMENTS 58-179693 10/1983 Japan.
1592390 7/1981 United Kingdom.

OTHER PUBLICATIONS

J. Eggert, "The Ignition of Explosives by Radiation," 63, *Journal of Physical Chemistry*, 11 (1959), pp. 11, 12, 14 only.

(List continued on next page.)

*Primary Examiner*—Charles L. Bowers, Jr.
*Attorney, Agent, or Firm*—Klarquist, Sparkman, Campbell, Leigh & Whinston

[57] ABSTRACT

A recording medium utilizing metal azides as an energy amplifying substance is disclosed. A photosensitive material comprises an energy absorptive dye and a metal azide dispersed in an inert binder. Low to moderate pulses of laser light cause the azide particles to react exothermally creating a void in the photosensitive material which can be read by an optical readout device.

9 Claims, 3 Drawing Figures

OTHER PUBLICATIONS

Julius Roth, "Initiation of Lead Azide by High-Intensity Light," 41:7, *The Journal of Chemical Physics,* 1929 (1964), pp. 1929-1936.

S. K. Deb, "Optical Absorption and Photoconductivity in Unstable Azides," 65, *Trans. Faraday Soc.,* 3187-94 (1969).

J. J. Robillard, "Possible Use of Certain Metallic Azides for the Development of a Field Controlled Dry Photographic Process," 19, *The Journal of Photographic Science,* 25 (1971), pp. 25-37.

J. T. Hagan and M. M. Chaudhri, "Low Energy Laser Initiation of Single Crystals of B-Lead Azide," 16, *Journal of Material Science,* 2457 (1981), pp. 2457-2466.

S. K. Deb, "Optical Absorption and Photoconductivity in Thin Films of Unstable Azides-1. Cuprous Azide", Transactions of the Faraday Society, 1969, vol. 65, 11, pp. 3074-3080.

Berg, A. D. et al., Journal of the SMPTE, vol. 83, 7/1974, pp. 588-593.

PROCESS OF USING METAL AZIDE RECORDING MEDIA WITH LASER

SUMMARY OF THE INVENTION

The present invention relates to the recording of binary information on recording media. More particularly, the invention relates to recording media containing energy amplifying substances.

In recent years, data storage systems have been developed to permanently store data on a recording material by a beam of radiant energy. Recording with beams of high-intensity light, such as with an intensity modulated laser beam, is advantageous due to the small size of the spots which can be created.

While laser recording equipment for data storage systems has been developed to an advanced state, a precise and convenient recording media has not previously been found. Conventional photographic plates have been used but are disadvantageous because they require special handling and must be chemically processed before the data can be retrieved.

Some recording media, including those that contain chemical dyes which change color in response to heat or light and those that are thin films or tapes which are perforated by pulses of intense laser light, do not require chemical development. However, to record on such media it has been necessary to use high-intensity lasers in order to generate enough energy to make recording marks. The production of high-intensity laser light is much more expensive than the production of lower intensity laser light. It is therefore desirable to provide a recording medium which will record information when subjected to comparatively low-intensity laser light.

One approach to low-intensity laser recording is disclosed in U.S. Pat. No. 3,787,210, dated Jan. 22, 1974, of Roberts. This patent describes a medium which employs a transparent substrate coated with heat-absorbing particles dispersed in a self-oxidizing binder. Specifically, Roberts refers to a recording film that comprises a substrate of an organic material coated with a material having heat-absorbing characteristics, such as carbon black particles, dispersed in a self-oxidizing binder such as nitrocellulose. As laser light strikes the medium, it is absorbed by the carbon black particles, and heat builds up to the point where combustion of the nitrocellulose is initiated. The combustion propels an area of the coating away from the substrate, leaving a clear spot surrounded by a dark background.

Because carbon black particles are used, the Roberts medium has a grain structure. This limits the resolution of the medium. And, Roberts' use of a self-oxidizing binder further limits resolution and presents other problems. Nitrocellulose is a poorly defined substance formed by treating cellulose with mixtures of nitric and sulfuric acid. Widely different nitrocellulose products are obtained by varying the source of cellulose, strengths of acids, temperature, time of reaction, and the acid cellulose ratio. Exact reproduction of a particular nitrocellulose has proven to be difficult due to the numerous variables in the reaction process. Thus, a medium of the type described by Roberts would be difficult to manufacture in commercial quantities due to uniformity and other quality control problems. This is undesirable as it is important that the media obtained from different batches possess a constant sensitivity to laser light in order to ensure that the spots generated are of uniform size and can be spaced closely to achieve maximum data density.

Another approach to low-intensity laser recording is described in U.S. application Ser. No. 143,827, filed Apr. 25, 1980, of Moore et al. and its foreign counterparts, such as U.K. Patent No. 1,592,390. The described recording medium is a polymer material containing particles of reactant substance. In one example, reactant particles are made by combining a metal reducing agent with an oxidizing agent such as barium chromate to form a thermite type mixture. The reactant particles react exothermally upon exposure to laser light of sufficient intensity. This reaction chars the polymer material, thus creating dark areas which can be read by an optical digital scanner. Thus, in the recording method of Moore et al., a polymer binder is charred whereas in the present invention a photosensitive material is ablated. Also, the reactant particles utilized in Moore et al. will produce a grain structure similar to that of the Roberts media, thus limiting resolution.

It has now been discovered that these and other problems of the prior art may be eliminated by providing a recording medium matrix with a photosensitive material that includes a molecular dispersion of a metal azide. Such a matrix proves to be a very precise recording medium. When a pulse of moderate intensity light strikes such a medium, that volume of the photosensitive material which is in the path of the pulse absorbs the light energy and is heated. This increase in heat causes the molecules of the reactant substance, i.e. metal azide, in the heated volume to predictably react exothermally. The additional heat energy and gasses liberated during the reaction are sufficient to create a void or hole in the photosensitive material.

A particularly advantageous medium according to the present invention includes a substrate material which is coated with a photosensitive material, and a protective transparent covering which overlies the photosensitive material. The photosensitive material is a solid solution which includes a metal azide compound, a dye, and a binder. When a beam of light is directed at such a medium, light energy is absorbed by the dye which in turn transfers energy to the azide. The azide explosively reacts liberating heat and nitrogen and creating a void or a hole in the photosensitive material. The void has different optical characteristics than the surrounding material which contains the dye and thus can be read by an optical scanner.

The photosensitive material of the invention does not utilize "grains" but rather includes homogeneously dispersed molecules of the metal azide and the absorbing dye. Because there are no "grains," the medium has very high resolution.

Some patents describe photographic media which form an image by the decomposition of organic azides. The images are formed by mechanisms that do not involve heat released during decomposition. And, the organic compounds have different characteristics than applicant's metal azides which are highly exothermally reactive. The organic azides are used as cross-linking agents, dye couplers, or initiators for polymerization. For example, in U.S. Pat. No. 4,287,294 of Rubner, organic azides are used as photo initiators. The organic azide in the Rubner patent absorbs the radiant energy and transfers this energy to an olefinically unsaturated polymer which initiates further polymerization or cross linking. This is distinct from the present invention in which a void is created by heat and gas given off as a metal azide reacts exothermally.

One object of this invention is to provide a digital recording medium which is able to utilize comparatively low intensity laser light as a recording source.

Another object of the invention is to provide a digital recording medium which, after being recorded upon, will provide high resolution when read by an optical scanner.

Another object of this invention is to provide a digital recording medium which, after being recorded upon, will provide a high signal to noise ratio when read by an optical readout device.

These and other objects, advantages, and features of this invention will be apparent from the following detailed description.

DETAILED DESCRIPTION

Figure 1:
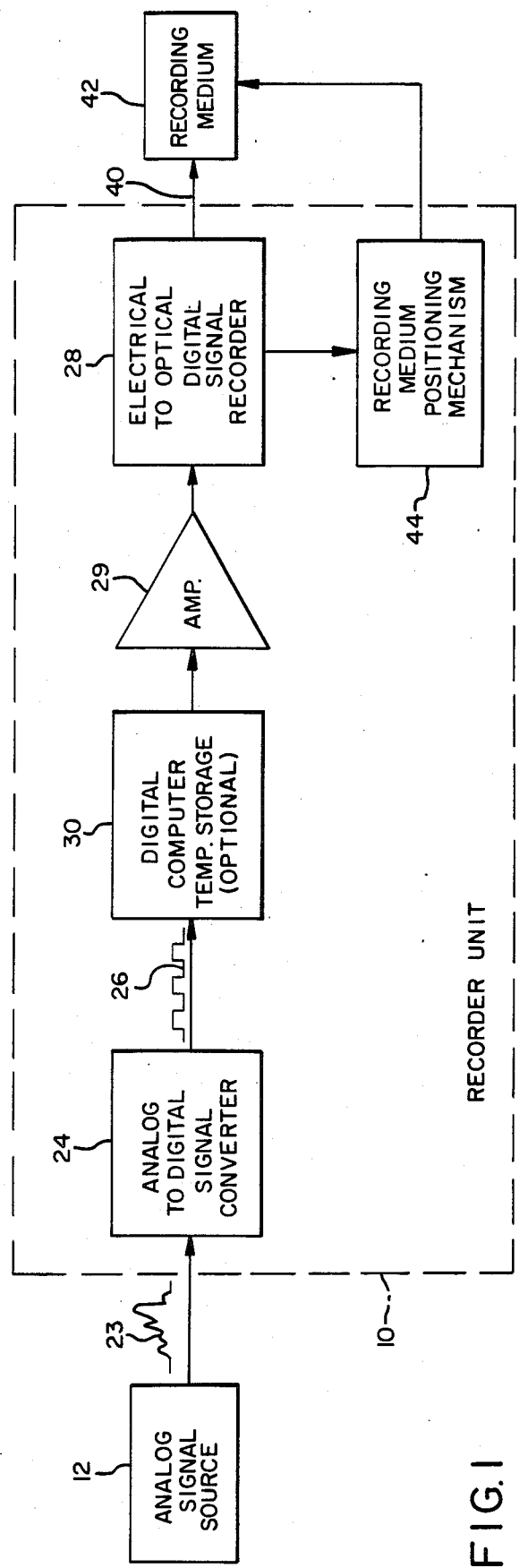
FIG. 1 is a block diagram of an analog to digital optical recording system capable of producing a permanent record on the recording medium of the present invention.

Referring to FIG. 1, a typical device is shown for recording an intelligence pattern by means of a radiant energy source, particularly a pulsed light source. The system includes a recorder unit 10 having its input connected to an audiovisual analog signal source 12, such as a microphone or television camera. This analog input signal 23 is applied to the input of an analog-to-digital signal converter 24 provided in the recorder unit 10 and which produces a digitally encoded electrical output signal 26. The output of the analog-to-digital signal converter 24 may be directly connected to an electrical optical digital signal recorder 28 through an amplifier 29 if it is desired to record the digital signal in real time simultaneously as it is generated. However, it may be desirable to temporarily store the digital signal 26 on the magnetic tape or other memory device of a digital computer 30 and to record such signals later at a more convenient time.

The electrical optical digital signal recorder 28 converts the digital electrical signal into a digital light signal and records such light signal by scanning a pulsed light beam 40 of small spot size on a photosensitive recording medium to produce a track of digitally encoded spots which can be less than one micron in diameter. The spots are transparent in an opaque background, thus providing the ones and zeros of a binary code. The recording medium is supported, in a fashion which may be conventional, for movement in a path perpendicular to the optical axis and is mechanically coupled to a recording medium positioning mechanism 44 adapted for moving the medium to produce the track of digitally encoded spots. The recording medium positioning mechamism 44 may include a drive motor (not shown) which is energized selectively in response to signals transmitted by the optical digital signal recorder 28.

The recording medium 42 of the present invention includes a matrix interspersed with one or more metal azides which are stable when exposed to light of first level of intensity, but which react exothermally when exposed to light at a second, higher level of intensity.

Figure 2:
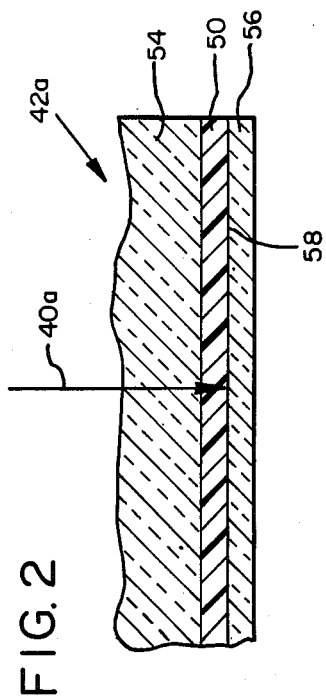

In FIG. 2, such a recording medium is shown as an active or recording layer 50 of photosensitive material, normally including a metal azide compound, a dye and a binder, on a smooth surface of a substantially transparent substrate 54. As described below, the active layer 50 can be a composite of two or more layers with the metal azide and dye in separate layers of the composite. A protective layer 56 may, optionally, be provided over the active layer 50 so that the protective layer 56 and substrate 54 protect opposite sides of the active layer from dust and other physical contaminants. Optionally, a thin reflective coating could be included on a surface 58 of the active layer 50 to reflect incident radiation 40a back into the active layer.

Figure 3:
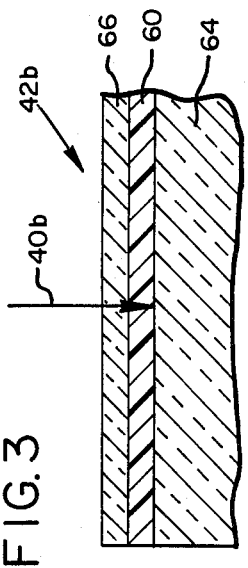
FIGS. 2 and 3 are side cross section views of recording media according to the present invention.

FIG. 3 shows a closely related embodiment for use with a beam 40b of incident radiation directed toward an active layer 60 rather than a substrate layer 64. In this embodiment, any protective layer 66 would be substantially transparent. And, if a reflective layer were used, it would best be located between the active layer 60 and the substrate 64.

In either embodiment, one or more subbing layers can be provided between the substrate and the active layer or between the protective layer and the active layer for the purposes described below. Such subbing layers must be substantially transparent if they are located in the path of the incident beam.

Photosensitive Material

A recording medium according to the present invention comprises a photosensitive material which includes an explosive material, particularly a metal azide. The metal azide reacts exothermally, when ignited, to amplify the energy of an incident radiation beam. Specifically, at the location where the beam strikes the medium, the exothermal reaction of the metal azide causes a heat build up and the formation of a visible mark or spot in the medium.

Cupric, lead, and silver azides are the best suited since they react highly exothermally and yet can easily be incorporated in a recording medium. The heats of formation for the azides are: cupric azide$= -140$ Kcal/mole, silver azide$= -74$ Kcal/mole, lead azide$= -115$ Kcal/mole.

The medium is formed by applying a layer containing the metal azide on a substrate material. The metal azide can be applied to the substrate in a binder of polymeric material, such as gelatin or applied directly by vapor deposition.

A typical medium according to the invention will have an active layer of photosensitive material that is 0.6 to 2.0 microns thick. This is suitable for recording data in a single plane. It is possible, however, to use multiple active layers in different focal planes so that data density can be increased by recording on the various layers.

Advantageously, the photosensitive material will also include a dye to facilitate absorption of energy from the energy source and conversion of the radiant energy into thermal energy. The dye should be selected for its ability to absorb energy, its low heat capacity and thermal conductivity. In the case of a medium to be written by a laser beam, the dye should be selected to absorb light at the wavelength of the irradiating light.

A large number of dyes are suitable for use in the metal azide recording medium. Those dyes which efficiently absorb the irradiating light and are soluble in suitable solvents are ideal. Erythrosin, erythrosin B, sudan III, rhodamine 6G and rose bengal are all suitable to sensitize a medium to the 514 nm output of an argon ion laser.

The photosensitive material may be formed to include the dye in at least two ways. The metal azide and dye can be applied as separate, but adjacent layers or can be intimately mixed in a single layer.

In a two layer system one can first form a layer consisting of a metal azide dispersed in a gelatin binder. A dye can then be applied as a coating in a 2% methanol solution. For example, a solution of rose bengal can be poured on a metal azide layer, which is then spun at 200 RPM until dry. The resulting photosensitive material is a clear red with an absorption coefficient of about 1.5 at 514 nm.

IR 125 dye has been used to form plates sensitive at 830 nm. As with the red dyes above, the IR 125 dye is made into a 2% methanol solution and coated on a metal azide/binder layer. The coated material is spun at 200 RPM until dry, and a clear green photosensitive material results. Such material has a broad absorption band covering the 800–850 nm region of the spectrum. Thus, such photosensitive material can be used to manufacture plates sensitive to the output of semiconductor lasers operating in this wavelength region.

Some dyes can also be applied in a 2% water solution. The water solution tends to cause a gelatin layer to slough off and is therefore not preferred for use alongside a metal azide in a gelatin binder.

Single layer photosensitive materials are desirable because the metal azide and dye are in intimate contact for maximum heat transfer to the metal azide and also because the material can be formed in a single coating step. It can sometimes be difficult to maintain both an explosive metal azide and a dye in a solution or suspension suitable for forming a layer. But, such can be accomplished using solutions of metal azide precursors; or a single layer can be formed by vacuum deposition.

To form a photosensitive material with dye and an explosive metal azide in intimate contact, a dye can be applied in a solution which also contains a highly soluble, but nonexplosive, azide compound. Most suitable would be an alkali azide, such as sodium azide, which can be maintained in solution with a dye and which will react with an appropriate metal compound to provide one of the explosive metal azides mentioned above. For example, 2 grams of a dye and 2 grams of sodium azide can be dissolved in 100 ml of methanol. Plates of a suitable substrate material are coated with an appropriate metal salt in a gelatin binder. Then, the plates are immersed in the solution whereupon the sodium azide reacts with the metal salt to form an explosive metal azide. The plates are not washed with water but are just spun dry. The result is a plate coated with a single layer that includes both the explosive metal azide and the dye.

While the use of a dye is the most convenient way to make light energy available to start an exothermic reaction in the metal azide, there are other possibilities. A medium would operate without a dye if the incident radiant energy was of a wavelength absorbed by the metal azide or by an adjacent binder material or subbing layer.

Substrates

Virtually any nonporous material with a smooth surface can be used as a substrate to support the photosensitive material. Glass plates of 0.060", 0.090" and 0.250" thickness have been used as have polymethylmethacrylate (PMMA), polyester, and polyacetate sheets. Flexible materials, such as thin films of polyester (Mylar), polyacetate, and polycarbonate, are also suitable.

Substantially transparent materials would be required if it is desired to record by directing the incident beam through the substrate, as in the embodiment of FIG. 2.

In the embodiment of FIG. 3, polished metal plates or any reflective or clear plastic could be used as a substrate. Glass or a polymer material, such as those listed above, can be plated with a material, such as gold or aluminum, to provide a substrate with a reflective surface on which to adhere the active layer.

Subbing Layers

Although a metal azide layer can be formed directly on any smooth surface, in many instances it is advantageous to provide a subbing layer between the active layer and the substrate. The subbing layer can improve the bonding of the active layer to some substrates and may have one or more additional uses.

It is difficult to form a smooth layer of photosensitive material on some polymer substrates. Apparently the nonpolar nature of the surface of some plastics effects the way films form. A subbing layer provides a smooth surface on which to apply the photosensitive material.

A subbing layer may be provided between the recording or active layer and a substrate to act as a thermal insulator. If heat is not prevented from dispersing into such a substrate, a larger laser will be required to initiate a reaction of the metal azide. A subbing material such as polyvinyl alcohol (PVA) has a thermal conductivity that is approximately an order of magnitude lower than that of glass or metal. Thus much less heat will be lost to a glass or metal substrate during recording if a PVA or other plastic subbing layer separates the recording layer and the substrate.

It is also useful to provide a subbing layer on a substrate that has a reflective surface, e.g., a metalized film or plate. A subbing layer of the proper thickness will serve to maximize the reflection through a recorded spot on such a substrate due to constructive interference of the incoming and reflected beam, thus maximizing the signal to noise ratio (SNR) of the medium.

Gelatin, PMMA, and PVA are examples of materials suitable for use as subbing layers. Layers of such materials have been solvent coated from water solutions or in the case of PMMA, a toluene solution. Any plastic may serve as a subbing layer if it has the proper optical, thermal, and solvent characteristics.

Protective Layers

A cover layer can be provided over the recording layer to protect the recording layer from scratches and to keep dust from the focal plane. Successful cover layers, at least about 10/1000 of an inch thick, have been made of PMMA, PVA, carbonate-linked resin (Lexan), silicone rubber, and glass. The PMMA and Lexan were solvent cast from toluene solutions. The PVA was cast from a water solution. The silicone rubber (RTV) was polymerized in place from a liquid monomer, and the glass was adhered to the recording layer using an optical adhesive (Norland).

If the recording beam is directed toward the active layer as shown in FIG. 3, the cover layer should be substantially transparent to the incident radiant energy beam. Recording with laser light has been performed through layers of each of the above materials.

Recording

To record data on the medium, a beam of high-intensity radiant engery, such as laser light, is directed toward the medium as shown in FIG. 2 or 3. Radiant energy is absorbed by the photosensitive material, particularly any dye that is present, until there is sufficient energy to activate an exothermic reaction of the metal azide.

Heat and nitrogen released during the reaction blow a hole in the photosensitive material, which can later be read as part of a binary data pattern. When a dye is present, the reaction blows off the dye in the area of the reaction leaving a light area on a dark field.

In tests of recording media according to the present invention, it has been possible to produce spots as small as 0.6 microns in diameter. With improvements in laser optics it may be possible to form even smaller marks.

The following examples describe several specific media according to the present invention.

EXAMPLE 1

Cupric azide can be formed in bulk and then dissolved in aqua ammonia, mixed with a binder and solvent coated to form a homogeneous active layer on a substrate. Cupric azide and silver azide can be used in this way.

The cupric azide is formed stochiometrically by mixing aqueous solutions of sodium azide and cupric sulfate. 3.2 grams of cupric sulfate are dissolved in 50 ml water and added to a solution of 2.6 grams of sodium azide dissolved in 50 ml water. Upon addition, a reddish brown precipitate of cupric azide is formed. The mixture is stirred for five minutes and then gravity filtered. The cupric azide precipitate is washed twice with 25 ml aliquots of water. The cupric azide is then dissolved in 100 ml of aqua ammonia. A film of the cupric azide is formed by mixing 2 ml of the above solution with 8 ml of a 2% solution of a gelatin in water. A drop of a surfactant, such as Kodak's Photoflo, is added to this mixture. The mixture is poured on a 4"×5" glass plate and spun at 200 RPM until dry. A clear thin film of cupric azide in a gelatin binder results. The film is approximately 1 to 2 microns thick.

EXAMPLE 2

Cupric azide can also be made in situ by forming a film of cupric sulfate in a binder on a suitable substrate. Four grams of cupric sulfate and 2 grams of gelatin are dissolved in 100 ml of water. One drop of a surfactant, such as Kodak's Photoflo, is added to this solution. This solution is poured on a 4"×5" glass plate and spun at 200 RPM for five minutes. The resulting plate is then immersed in a 2% methanol solution of sodium azide for five minutes. The plate is removed from the bath and washed with water and spun dry.

EXAMPLE 3

Lead azide is made in situ in a manner similar to that of cupric azide. Four grams of lead acetate and 2 grams of gelatin are dissolved in 100 ml water. A drop of a surfactant, such as Kodak's Photoflo, is added. The solution is coated on a 4"×5" glass plate and spun for five minutes. The dry plate is then immersed in a 2% solution of sodium azide in methanol for five minutes. The plate is washed with water and spun dry.

EXAMPLE 4

Silver azide can also be made in situ. Four grams of silver nitrate and 2 grams of gelatin are dissolved in 100 ml water and 1 drop of a surfactant, such as Kodak's Photoflo, is added. This solution is poured on a 4"×5" glass plate and spun at 200 RPM for five minutes. The plate is then immersed in a 2% sodium azide in methanol solution for five minutes. The plate is washed in water and spun dry. The silver azide is formed as a homogeneous mixture in the gelatin binder.

EXAMPLE 5

The cupric azide formed in Example 1 can be coated on other substrates. A PMMA sheet 1 mm thick is prepared for coating by washing with methanol while rotating at 500 RPM. The material comprising the photosensitive layer is made by mixing 32 ml of a 2% aqueous gelatin solution with 8 ml of a 2% cupric azide solution in aqua ammonia. Sixteen drops of 17% formaldehyde is added to this mixture. This mixture is poured on the PMMA substrate and spun at 200 RPM for 5 minutes. After drying, the plate is coated with a 1% solution of IR 125 dye in methanol and spun at 200 RPM for 3 minutes. An insulating subbing layer is then applied by vacuum coating the plate with silicon oxide until a silicon oxide layer 2,000 angstrom thick is created. A reflective layer may then be provided by vacuum depositing an aluminum layer approximately 2,000 angstroms thick. A 4,000 angstrom thick protective layer of silicon oxide is then deposited over the aluminum. An incident laser beam records on this medium through the PMMA substrate layer.

EXAMPLE 6

Single layer azide-dye combinations can be formed by a slight modification of the procedures described in Examples 2, 3, and 4. The layer is formed by dissolving 2 grams of dye, such as rose bengal, with 2 grams of sodium azide in 100 ml of methanol. A plate coated with one of the previously described metal salt layers is then immersed in the methanol solution, and then spun dry.

EXAMPLE 7

The active layer can be applied to a substrate by a vacuum deposition technique employing resistance heating or sputtering. These techniques elminiate the need to use a binder material.

A 4"×5" glass plate, one millimeter thick, is placed in a vacuum chamber with two resistance heated boats. The first boat contains cuprous chloride, the second contains potassium azide. After the chamber is evacuated to $10^{-6}$ torr, current to the first boat is adjusted to deposit a layer of cuprous chloride 100 angstroms in thickness, at 20 angstroms per second. Next, current is supplied to the second boat to deposit 100 angstroms of the potassium azide, which reacts instantly to form cuprous azide and potassium chloride on the substrate. Current is then applied to the first boat and the procedure repeated until three to five layers are deposited. The resulting medium has an active layer 0.6 to 1.0 micron thick.

Dye and subbing layers are provided by solvent coating. One or more such layers can be solvent coated on the substrate before vacuum deposition. Or, such layers can be solvent coated over an azide layer previously formed by vacuum deposition.

EXAMPLE 8

It is also possible to use vacuum deposition to form a single active layer containing both a metal azide and a dye.

The procedure of Example 7 is repeated in a vacuum chamber equipped for sputtering. In this case, three boats or "targets" are provided. A dye, such as rose bengal, occupies the third boat.

To deposit the dye, a cathode is heated causing it to emit electrons which are accelerated through argon gas, at a negative pressure, in the chamber. The dye target is negatively biased to attract argon ions formed in the chamber. The ions strike the dye with sufficient energy to eject that substance from the target and onto the substrate.

The cuprous chloride and potassium azide can be deposited by resistance heating as described in Example 7 or by sputtering, i.e., in the same manner that dye is deposited in this example. The dye is preferably deposited at about the same rate as the other substances, i.e., at about 20 angstroms per second, so that equal amounts of the three substances are deposited. The three substances are deposited in repeated, alternating applications, until a single 0.6 to 1.0 micron layer is formed. The resulting layer is a substantially uniform dispersion of cuprous azide, potassium chloride, and dye.

EXAMPLE 9

Media can formed by yet another vapor deposition technique.

A thin metal film of lead, silver, or copper is converted to metal azide. The film, of 0.5 micron thickness, is exposed to hydrazoic acid vapor in a closed chamber for 8 hours. The resulting film includes homogeneous metal azide. In some instances, the film would then be coated with a suitable dye, such as rose bengal or IR 125, as described in previous examples.

We have shown and described the preferred embodiments of our invention. It will be apparent to those skilled in the art that changes may be made without departing from our invention in its broader aspects. We therefore intend the appended claims to cover all such changes and modifications as follow in the true spirit and scope of the invention.

We claim:

1. The method of recording images on a recording medium which comprises contacting a beam of laser light with a medium containing (a) a substrate material, and (b) on the substrate material, a photosensitive material comprising an energy absorptive dye selected from the group consisting of erythrosin, erythrosin B, rhodamine 6G, sudan 111, rose bengal, IR 125 and mixtures thereof, and a metal azide selected from the group consisting of cupric azide, lead azide, silver azide and mixtures thereof, the dye and the metal azide being present in amounts sufficient that the beam causes the metal azide to exothermally react at the location of contact, form a void in the photosensitive material, thereby leaving a light area on a dark field, which area can be read by an optical readout device.

2. The method of claim 1 in which the recording medium comprises a transparent protective covering over the photosensitive material.

3. The method of claim 1 in which the metal azide is dispersed in an inert binder formed from a 2% solution of gelatin in water.

4. The method of claim 1 in which the substrate material is selected from the group of materials consisting of glass, polymethylmethacrylate, polyester, polyacetate, polycarbonate, and any such materials plated with a reflective material.

5. The method of claim 1 in which a subbing layer is provided between the photosensitive material and substrate.

6. The method of claim 5 in which the subbing layer is selected from the group consisting of polyvinyl alcohol, polymethylmethacrylate, SiO, gelatin and mixtures thereof.

7. The method of claim 5 in which the subbing layer comprises a thermally insulative material.

8. The method of claim 2 in which a subbing layer is provided between the photosensitive material and the covering.

9. The method of claim 2 in which the transparent covering is selected from the group consisting of polymethylmethacrylate, polyvinyl alcohol, Lexan, silicone rubber, and glass.

* * * * *